United States Patent [19]
Burfeindt

[11] Patent Number: 5,381,383
[45] Date of Patent: Jan. 10, 1995

[54] SONAR TRANSDUCER CALIBRATION APPARATUS AND METHOD

[75] Inventor: Karl L. Burfeindt, Plainview, N.Y.

[73] Assignee: Unisys Corporation, Blue Bell, Pa.

[21] Appl. No.: 160,311

[22] Filed: Dec. 2, 1993

[51] Int. Cl.⁶ .............................................. H04B 17/00
[52] U.S. Cl. .................................................... 367/13
[58] Field of Search ........................... 367/13; 73/1 DV

[56] References Cited

U.S. PATENT DOCUMENTS

| | | | |
|---|---|---|---|
| 3,373,842 | 3/1968 | Burbank et al. | 367/13 |
| 4,205,394 | 5/1980 | Pickens | 367/13 |
| 4,576,034 | 3/1986 | Ferree et al. | 367/13 |

*Primary Examiner*—Ian J. Lobo
*Attorney, Agent, or Firm*—Albert B. Cooper; Mark T. Starr

[57] ABSTRACT

Calibration parameters such as bias, azimuth misalignment and scale factor for a velocity measuring sonar transducer are determined by mounting the transducer in a tank of water on a stationary mount. A continuous belt on a pair of rollers at the bottom of the tank simulate the ocean floor. The sonar transducer is precisely aligned with the roller mechanism at 0° and can be precisely rotated by 90° from the 0° position. The rollers are operated in a forward and reverse direction. Distance estimates provided by the transducer, together with precise measures of the distance traveled by the simulated ocean bottom, are utilized to compute the calibration parameters.

23 Claims, 4 Drawing Sheets

$$(1)\quad B_X = 0.5\left[\frac{D_{X0+} + D_{X0-} - D_{X90+} + D_{X90-}}{2}\right]$$

$$(2)\quad B_Y = 0.5\left[\frac{D_{Y90-} + D_{Y90+} - D_{Y0+} + D_{Y0-}}{2}\right]$$

$$(3)\quad \theta = 0.5\left[TAN^{-1}\left(\frac{D_{Y0-} - D_{Y0+}}{D_{Y90-} - D_{Y90+}}\right) + TAN^{-1}\left(\frac{D_{X90-} - D_{X90+}}{D_{X0+} - D_{X0-}}\right)\right]$$

$$(4)\quad \delta_{SFX} = \frac{D_{X0+} - D_{X0-}}{2D_S \cos\theta} - 1$$

$$(5)\quad \delta_{SFY} = \frac{D_{Y90-} - D_{Y90+}}{2D_S \cos\theta} - 1$$

FIG. 3

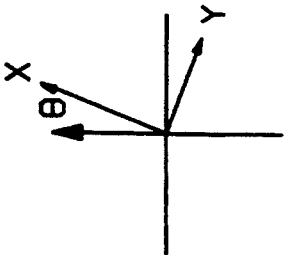

FIG. 4A — ZERO DEGREE ORIENTATION (6) $D_{X0+} = (\varepsilon_{SFX} + 1) D_S \cos\theta + B_X$ (7) $D_{X0-} = -(\varepsilon_{SFX} + 1) D_S \cos\theta + B_X$ (8) $D_{Y0+} = -(\varepsilon_{SFY} + 1) D_S \sin\theta + B_Y$ (9) $D_{Y0-} = +(\varepsilon_{SFY} + 1) D_S \sin\theta + B_Y$

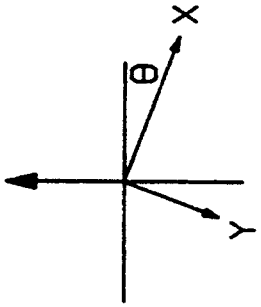

FIG. 4B — 90 DEGREE ORIENTATION

(10) $D_{Y90+} = -(\varepsilon_{SFY} + 1) D_S \cos\theta + B_Y$

(11) $D_{Y90-} = (\varepsilon_{SFY} + 1) D_S \cos\theta + B_Y$

(12) $D_{X90+} = -(\varepsilon_{SFX} + 1) D_S \sin\theta + B_X$

(13) $D_{X90-} = (\varepsilon_{SFX} + 1) D_S \sin\theta + B_X$

SONAR TRANSDUCER CALIBRATION APPARATUS AND METHOD

BACKGROUND OF THE INVENTION

1. Field of the Invention

The invention relates to sonar transducers particularly with respect to the velocity measuring type.

2. Description of the Prior Art

Velocity measuring sonar transducers are ubiquitously utilized in correlation velocity log (CVL) sonar systems, doppler ground velocity sonar systems and dead reckoning marine navigation systems. The more precise systems utilize a ground speed measuring transducer which is not subject to ocean currents. Such transducers are typically of the "Janus" type transmitting four narrow beams toward the ocean bottom, each beam being displaced approximately 30° from the vertical. The beams are disposed to radiate from the transducer with each beam separated by 90° from adjacent beams. The transducer is mounted either with the beams directed fore/aft and athwartship or directed 45° with respect thereto.

Such transducers are subject to three principal errors namely scale factor, azimuth misalignment (boresight) and bias. The scale factor error is of a multiplicative type resulting in the measured velocity differing from the actual velocity by a multiplicative factor. The velocity output of the system is corrected by multiplying by an appropriate scale factor. Azimuth misalignment is a function of how accurately the sonar transducer is aligned with the longitudinal axis of the navigation system in which the transducer is utilized. Azimuth misalignment results in cross-track error measured by the cross-axis beams. The bias error is additive and manifests itself in fore/aft and athwartship velocity bias errors. The measured velocity is offset from the actual velocity by an additive factor. The scale factor and alignment errors increase as a function of distance traveled while the bias errors increase as a function of time.

Dead reckoning marine navigations systems utilize such transducers as a means of measuring velocity which is usually resolved into north and east components about ships' heading utilizing data from a compass. The components are then integrated to generate vehicle position.

The types of sonar systems described may be utilized in combination with an inertial navigator which provides continuous velocity and position but must be frequently updated with ground speed from the sonar system in order to maintain accuracy. These precise inertial navigators require that the azimuth alignment of the sonar transducer with respect to the inertial navigator be precisely known in order to avoid errors in the resolution of velocity from body to geodetic coordinates. For example, a 1 milliradian error in azimuth alignment causes a cross-track error equal to 0.1% of distance traveled. Similarly, a scale factor error of 0.1% causes a fore/aft position error equal to 0.1% of distance traveled. In addition to azimuth misalignment and scale factor errors, the sonar fore/aft and athwartship velocity bias errors also contribute to the position error. Thus, in such inertial navigation systems and such sonar navigation systems these parameters must be very precisely determined in order for the systems to provide accurate navigation information.

Manufacturers of such sonar transducers utilize manufacturing and assembly techniques that minimize these errors. The manufacturers, however, only guarantee a scale factor error to ±0.2% with no guarantee of azimuth alignment. Typically, azimuth misalignment errors of approximately 5 milliradians occur in production units. These tolerances are an order of magnitude too large to provide the accuracy required in present day navigation systems.

In order to obtain the required navigational accuracy, the scale factor, azimuth misalignment and bias parameters are determined in the prior art as follows. The transducer is calibrated by the manufacturer as part of a calibration procedure involving traversing a known distance, such as a measured mile or longer. This process must be performed at two speeds in order to separate bias from scale factor. Alternatively, the user calibrates each system by traversing an extended distance, such as 30-50 miles, after installation in the vehicle. This process requires the use of a precise position reference and also must be performed by operating at two different speeds. The nominal scale factors are obtained by moving the sonar through the known distance. The scale factor error is obtained by taking the difference between the indicated and actual distances divided by the actual distance traveled. Long distances are required in order to obtain an accurate scale factor. Similarly, misalignment is measured by moving the sonar through a known distance and measuring the cross-track component. Bias errors are typically obtained by operating the sonar at zero vessel speed for a sufficient period of time.

These prior art techniques suffer from the disadvantage of requiring the transducer to traverse large precisely known distances in a vessel utilizing either a precisely measured waterway or a precise position reference. The prior processes are impractical for factory calibration, are slow and tedious, requiring significant supervision and human intervention during calibration. The prior art techniques are also subject to at-sea disturbances, salinity variation, reference position errors, heading errors and human error. The prior art techniques only permit calibration of forward scale factor, it being assumed that the athwartship scale factor is equal to the fore/aft scale factor. When operating in regions of large cross-currents, it is especially important to have an accurate athwartship scale factor which the prior techniques do not provide.

SUMMARY OF THE INVENTION

The above disadvantages of the prior art are obviated by utilizing a stationary sonar transducer mounted over a simulated ocean bottom that moves on a roller mechanism in a tank of water or an appropriate body of water. The sonar transducer is precisely aligned with respect to the roller mechanism at, for example, the zero degree position. The transducer can be precisely rotated by 90° from the zero degree position. The rollers are operated in either a forward or reverse direction and the distance traveled is proportional to the number of roller revolutions. This traversed distance can be measured to better than one inch. The fore/aft and athwartship velocity measurements from the sonar electronics are integrated to provide fore/aft and athwartship distance measurements. The distance measurements are applied to equations to provide the scale factor, azimuth alignment and bias errors for the transducer.

BRIEF DESCRIPTION OF THE DRAWINGS

FIG. 3 is a chart of equations utilized to calculate the five desired error calibration parameters by combining the eight measurements illustrated with respect to FIGS. 1 and 2.

FIGS. 4A and 4B are charts of equations and pictorial diagrams illustrating how the scale factor, transducer misalignment and sonar bias errors corrupt the measurements taken utilizing the apparatus of FIGS. 1 and 2. Equations (6) through (13) are utilized to derive the calibration parameter equations of FIG. 3.

DESCRIPTION OF THE PREFERRED EMBODIMENT

Figure 1:
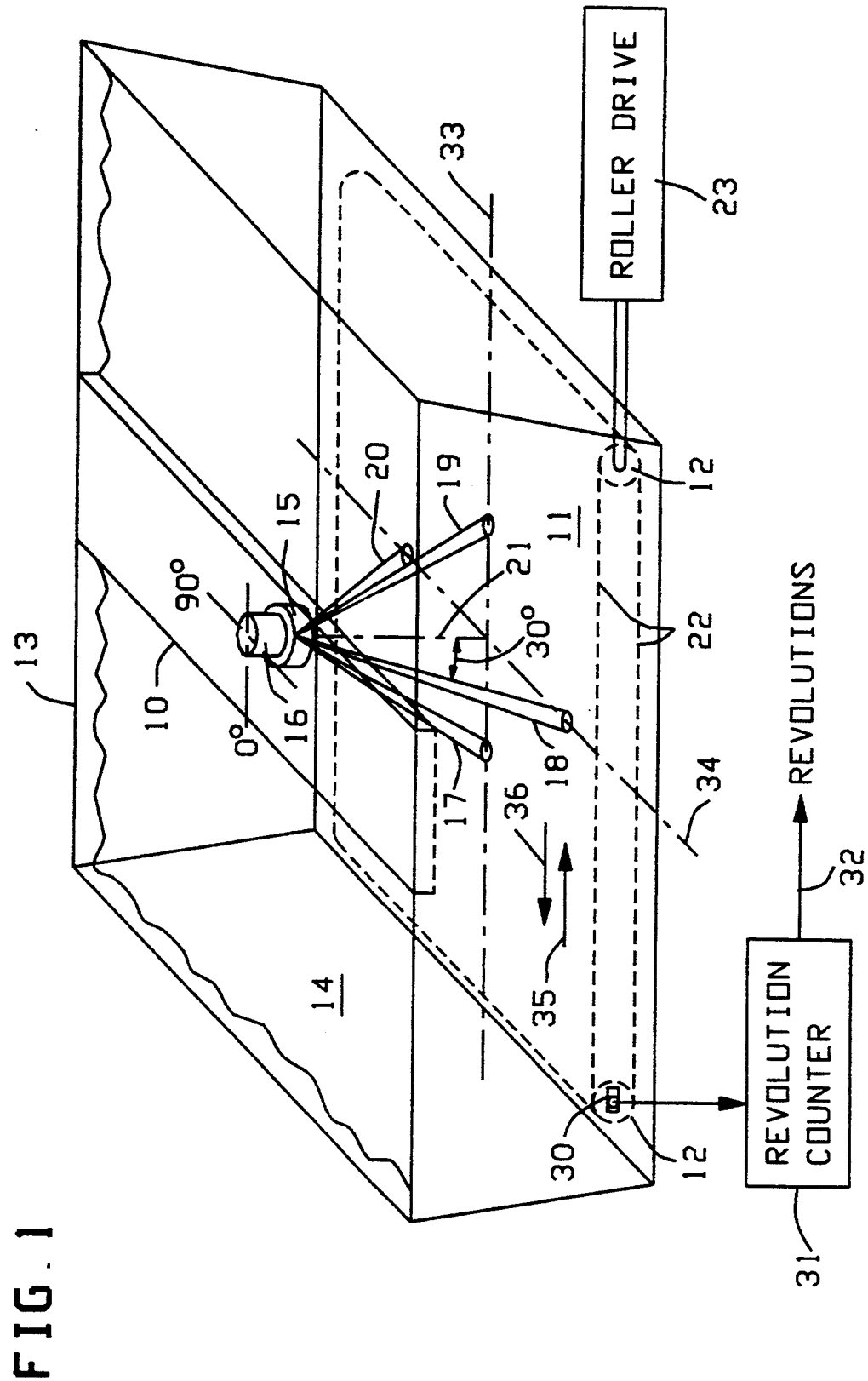
FIG. 1 is a three-dimensional view of a water tank embodiment of the present invention.
Figure 2:
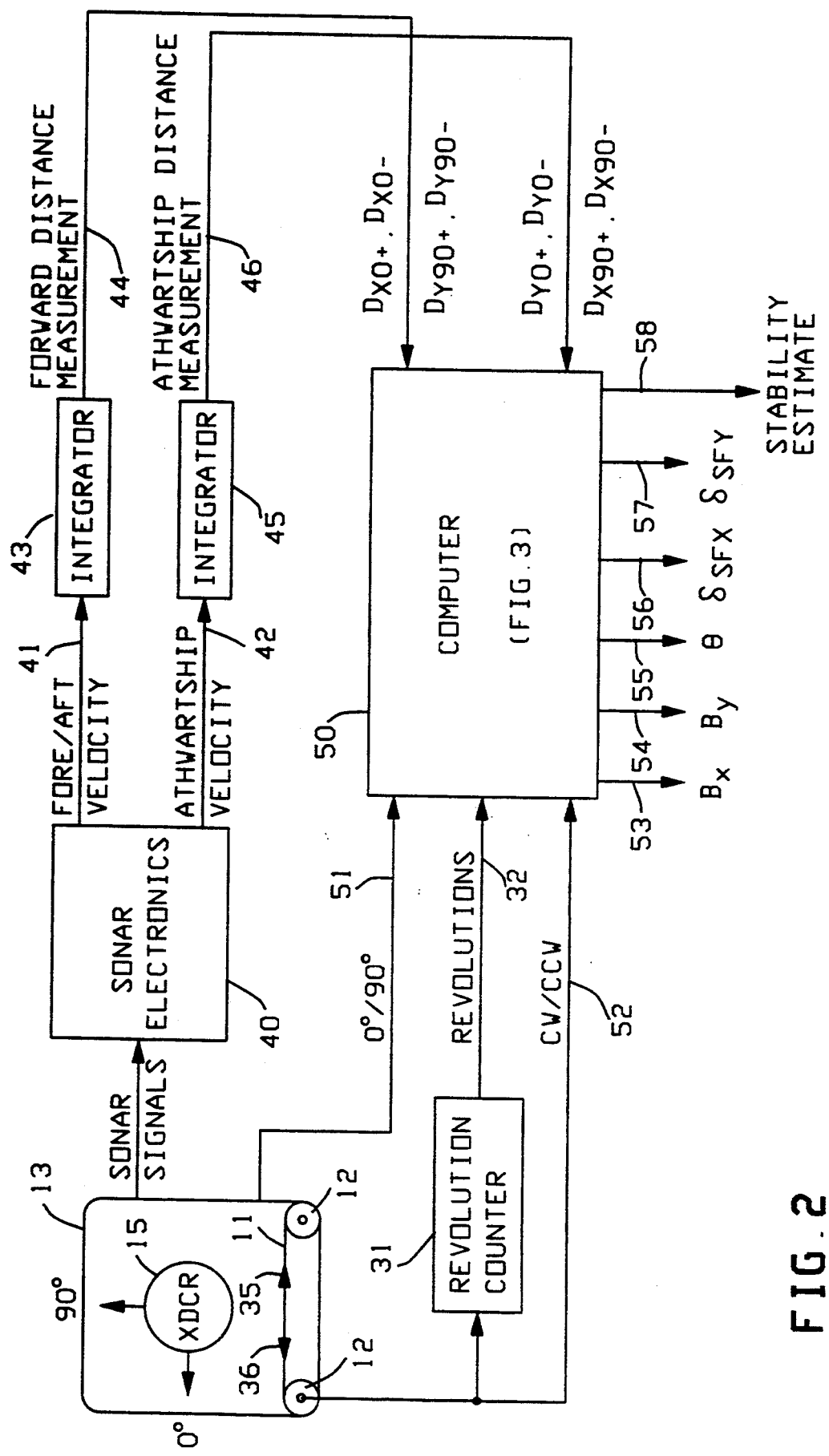
FIG. 2 is a schematic block diagram illustrating the zero and 90° mounting configurations of the apparatus of FIG. 1 for deriving the eight measurements utilized in equations (1) through (5) of FIG. 3.

Referring to FIGS. 1 and 2, in which like reference numerals indicate like components, the sonar calibration apparatus of the present invention utilizes a stationary sonar transducer mount 10 and a simulated bottom 11 which moves on a roller mechanism 12 comprising a pair of rollers in a tank 13 filled with water 14. The invention can also be utilized without the tank 13 in an appropriate body of water. A sonar transducer 15 is mounted on an indexing mechanism 16 which positions the transducer 15 at cardinal angles. By the indexing mechanism 16 the sonar transducer 15 is precisely aligned with respect to the roller mechanism 12 in the indicated zero degree position and can be precisely rotated by 90° from the zero degree position as illustrated in FIGS. 1 and 2.

In a conventional manner, the sonar transducer 15 emits four narrow beams 17, 18, 19 and 20 that impinge on the simulated bottom 11. When the sonar transducer 15 is indexed to the zero degree position, beams 17 and 19 provide the fore/aft beams and the beams 18 and 20 provide the athwartship beams. The beams 17-20 are emitted at an angle of 30° from the vertical 21 and are displaced from each other by 90°.

A revolution counter mechanism 30 is coupled to the roller mechanism 12 and provides a signal to revolution counter 31 to provide a precise measure of the number of revolutions of the roller mechanism 12 on a lead 32. The fore/aft axis of the calibration apparatus is illustrated at 33 and the athwartship axis thereof is illustrated at 34. The tank 13 is constructed with outwardly sloping sides to minimize sonar reflections therefrom. Additionally, the sides of the tank 13 may be coated with an acoustically absorbent material.

The surface of the simulated bottom 11 is textured for dispersing the sonar signals so that a component is returned to the transducer 15 from each of the four beams 17-20. The texture of the bottom 11 should reasonably simulate an ocean floor. The simulated bottom 11 is preferably constructed utilizing a flexible continuous belt 22 conveyed by the roller mechanism 12 in a manner similar to that of a conveyer belt. The rollers 12 can be operated in either a forward (clockwise) or reverse (counter-clockwise) direction as indicated by arrows 35 and 36, respectively. The distance traveled is proportional to the number of roller revolutions and can be measured to better than one inch. The bi-directional motion of the roller mechanism 12 is imparted in a conventional manner by a roller drive 23.

With particular reference to FIG. 2, the transducer 15 is schematically illustrated mounted in the tank 13 oriented selectively at the cardinal positions 0° and 90° as illustrated. The sonar signals returned to the transducer 15 from the simulated bottom 11 are provided to conventional sonar electronics 40. In a manner well known in doppler sonar, the electronics 40 processes the sonar signals from the transducer 15 and generates fore/aft velocity on a lead 41 and athwartship velocity on a lead 42. The fore/aft velocity signal is processed in an integrator 43 to provide a forward distance measurement estimate on a lead 44. The athwartship velocity signal is processed in an integrator 45 to provide an athwartship distance measurement estimate on a lead 46.

The distance measurements on the leads 44 and 46 are applied to a computer 50 that also receives as an input the revolution signal on the lead 32. The indexing mechanism 16 (FIG. 1) provides a signal to the computer 50 on a lead 51 indicating if the transducer 15 is positioned to 0° or 90°. The computer 50 also receives a signal on a lead 52 indicating whether the motion of the simulated bottom 11 is clockwise or counter-clockwise. The computer 50 processes the inputs thereto in accordance with the equations illustrated in FIG. 3 to generate the five desired parameters on leads 53–57, respectively.

With continued reference to FIGS. 1 and 2, in accordance with the invention, the sonar transducer 15 is positioned in both the 0° and 90° orientations. Assume the transducer 15 is initially positioned in the 0° orientation. The rollers 12 are then run in the clockwise direction 35 for a predetermined period of as distance $D_{X0+}$ and provide this estimate on the lead time to simulate a precise distance $D_S$. The sonar electronics 40 and integrator 43 estimate this distance 44 to the computer 50 for recording therein. This estimate is corrupted by the scale factor, the bias errors and the transducer misalignment. The sonar electronics 40 and integrator 45 also estimate $D_{Y0+}$ which represents the cross-track distance and is expected to be a small value. The estimate $D_{Y0+}$ is provided on the lead 46 to the computer 50 for recording therein. The rollers 12 are then operated in the reverse direction estimate $D_{X0-}$ and $D_{Y0-}$ which are provided on the leads (counter-clockwise 36) for the same period of time. The sonar electronics 40 and integrators 43 and 45 44 and 46, respectively, for recording in the computer 50. The sonar transducer 15 is now positioned in the 90° orientation and the roller sequence is repeated as described. The sonar electronics 40 and integrators 43 and 45 estimate $D_{Y90+}$, $D_{X90+}$, $D_{Y90-}$ and $D_{X90-}$ which are recorded in the computer 50.

By combining these eight measurements, the computer 50 calculates the five desired parameters as set forth in equations (1) through (5) illustrated in FIG. 3. The following nomenclature is utilized:

$B_X$ = Bias error in X direction (divide by run time to obtain velocity bias)

$B_Y$ = Bias error in Y direction (divide by run time to obtain velocity bias)

$\theta$ = Misalignment of sonar transducer $\delta_{SFX}$ = Scale factor error in X direction $\delta_{SFY}$ = Scale factor error in Y direction.

Calibration is also possible by operating the mechanism at two different forward speeds rather than reversing direction.

Referring to FIGS. 4A and 4B, equations (6) through (13) were utilized to derive the parameter equations (1)

through (5) of FIG. 3. Each equation (6) through (13) illustrates how the scale factor, transducer misalignment and sonar bias errors corrupt each measurement.

Equations (1), (2) and (3) each have two parts which are normally expected to yield similar values. The computer 50 utilizes these parts of these equations to assess the stability of a sonar transducer during calibration by comparing the two parts to each other. The computer 50 then outputs a stability estimate on a lead 58.

If the Y-direction scale factor is not considered critical, economy can be effected by performing the calibration only in the 0° orientation. In this case the X-direction scale factor value is used as the Y-direction scale factor with a small degradation in accuracy but with a reduction in calibration time of 50%. Accordingly, readily apparent modifications to equations (1) through (3) should be effected. For example, azimuth misalignment can be closely estimated by using only the left side of equation (3) of FIG. 3 and by setting the denominator thereof to one-half the distance traveled (0.5 $D_S$).

The invention permits each transducer to be individually calibrated without traversing long distances in a vessel along a precisely measured waterway or without the use of a precise position reference. The apparatus of the invention can be installed in a tank or a body of water and does not require any supervision or human intervention during calibration. The invention permits quicker, more accurate, calibration because there is less uncertainty in the data required to derive the parameters than there is with conventional methods (i.e. the equivalent distance traversed is known to better than one inch).

The present invention permits accurate athwartship scale factor calibration by operating the apparatus with the sonar transducer indexed to 90°. In the prior art only the forward scale factor is calibrated and it is assumed that the athwartship scale factor is equal to the fore/aft scale factor. When operating in regions of large cross-currents it is especially important to have an accurate athwartship scale factor.

The present invention is more accurate than prior art techniques because, since the entire mechanism is mechanically controlled, the indexing and roller distance measurement can be very precise and is not subject to at-sea disturbances, salinity variation, reference position errors, heading errors, or human errors. The invention permits a more rapid determination of the parameters because of its inherent accuracy. Much less space and human intervention are required than with prior art techniques.

If calibration is performed utilizing two different forward speeds rather than reversing directions, equations (6) through (13) are appropriately adjusted before deriving equations (1) through (5). The equations (6), (8), (10) and (12) that apply to clockwise rotation would then apply to one of the speeds whereas the equations (7), (9), (11) and (13) that apply to counter-clockwise rotation would then apply to the other of the speeds.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. Apparatus for determining calibration parameters for a velocity measuring sonar transducer comprising:

a body of water,
a mount for mounting said sonar transducer in said body of water,
a roller mechanism,
a simulated bottom for said body of water mounted on said roller mechanism and driven thereby to move in a predetermined direction with respect to said sonar transducer,
means coupled to said roller mechanism for providing motion data relating to motion of said simulated bottom with respect to said body of water,
said sonar transducer being mounted on said mount in a precise alignment with said predetermined direction,
said sonar transducer emitting sonar beams that impinge on said simulated bottom,
means for gathering sonar data from said sonar transducer relating to the velocity of said bottom with respect to said sonar transducer, and
computer means responsive to said motion data and said sonar data for determining said calibration parameters in accordance with discrepancies therebetween.

2. The apparatus of claim 1 wherein said roller mechanism includes roller drive means for driving said roller mechanism so that said simulated bottom moves in said predetermined direction and in a reverse direction opposite to said predetermined direction.

3. The apparatus of claim 1 wherein said roller mechanism comprises a pair of rollers and said simulated bottom comprises a continuous belt driven by said pair of rollers.

4. The apparatus of claim 3 wherein said means for providing motion data includes revolution counter means coupled to said roller mechanism for measuring the distance traveled by said continuous belt, thereby to provide said motion data.

5. The apparatus of claim 1 wherein said simulated bottom is textured to disperse said sonar beams.

6. The apparatus of claim 1 wherein said precise alignment is a 0° position, said apparatus further including an indexing mechanism for mounting said transducer on said mount, said indexing mechanism being operative to precisely rotate said transducer by 90° from said 0° position.

7. The apparatus of claim 1 further including:
a tank for containing said body of water, said mount being fixed to said tank, said roller mechanism and simulated bottom being located at the bottom of said tank.

8. The apparatus of claim 7 wherein said tank is constructed to minimize sonar reflections back to said sonar transducer from the sides of said tank.

9. The apparatus of claim 8 wherein said sides of said tank are sloping outwardly.

10. The apparatus of claim 1 wherein said calibration parameters comprise the bias error, azimuth misalignment error and scale factor error of said sonar transducer.

11. The apparatus of claim 10 wherein said bias error includes fore/aft bias error and cross-track bias error and said scale factor error includes fore/aft scale factor error and cross-track scale factor error.

12. The apparatus of claim 11 wherein:
said roller mechanism includes roller drive means for driving said roller mechanism so that said simulated bottom moves in said predetermined direction and in a reverse direction opposite to said predetermined direction, said roller mechanism comprises a pair of rollers, and said simulated bottom comprises a continuous belt driven by said pair of rollers.

13. The apparatus of claim 12 wherein said means for providing motion data includes revolution counter means coupled to said roller mechanism for measuring the distance traveled by said continuous belt, thereby to provide said motion data.

14. The apparatus of claim 13 wherein said precise alignment is a 0° position, said apparatus further including an indexing mechanism for mounting said transducer on said mount, said indexing mechanism being operative to precisely rotate said transducer by 90° from said 0° position to a 90° position.

15. The apparatus of claim 14 wherein said computer means includes integrator means responsive to said sonar data for integrating said sonar data, thereby providing distance estimate signals of said distance traveled by said continuous belt.

16. The apparatus of claim 15 operative with said indexing mechanism positioning said transducer to said 0° position, to activate said roller drive means to drive said pair of rollers so that said continuous belt moves at a first velocity for a predetermined time interval, said computer means being operative to record said distance traveled by said continuous belt and to record said distance estimate signals of said distance traveled by said continuous belt, to activate said roller drive means to drive said pair of rollers so that said continuous belt moves at a second velocity for said predetermined time interval and again record said distance traveled and said distance estimate signals, with said indexing mechanism positioning said transducer to said 90° position, to activate said roller drive means to drive said pair of rollers so that said continuous belt moves at a first velocity for a predetermined time interval, said computer means being operative to record said distance traveled by said continuous belt and to record said distance estimate signals of said distance traveled by said continuous belt, to activate said roller drive means to drive said pair of rollers so that said continuous belt moves at a second velocity for said predetermined time interval and again record said distance traveled and said distance estimate signals, said computer means being operative to derive said calibration parameters from the recorded distance data and estimate signals in accordance with discrepancies therebetween.

17. The apparatus of claim 16 wherein said first velocity comprises a predetermined speed in said predetermined direction and said second velocity comprises said predetermined speed in said reverse direction.

18. A method for determining calibration parameters for a velocity measuring sonar transducer comprising:

mounting said sonar transducer in a body of water, moving a simulated bottom for said body of water in a predetermined direction with respect to said sonar transducer, providing motion data relating to motion of said simulated bottom with respect to said body of water, said sonar transducer being mounted in said body of water precisely aligned with said predetermined direction, emitting sonar beams from said sonar transducer that impinge on said simulated bottom, gathering sonar data from said sonar transducer relating to the velocity of said simulated bottom with respect to said sonar transducer, and computing said calibration parameters from said motion data and said sonar data in accordance with discrepancies therebetween.

19. The method of claim 18 wherein said providing step comprises:

measuring the distance traveled by said simulated bottom, said computing step further including integrating said sonar data to provide distance estimates and computing said calibration parameters from said distance estimates and said distance traveled.

20. The method of claim 19 further comprising:

moving said simulated bottom with respect to said transducer at two different velocities.

21. The method of claim 20 wherein said two different velocities comprise a predetermined speed in said predetermined direction and said predetermined speed in a direction opposite said predetermined direction, respectively.

22. The method of claim 20 further including:

aligning said transducer at a 0° position precisely aligned with said predetermined direction and precisely rotating said transducer by 90° from said 0° position to a 90° position.

23. The method of claim 22 wherein said computing step further includes computing said calibration parameters utilizing said distance estimates taken with respect to said two different velocities and with respect to said 0° and 90° positions.

* * * * *